United States Patent
Vegso et al.

(10) Patent No.: US 12,292,131 B2
(45) Date of Patent: May 6, 2025

(54) GATE VALVE AND VALVE ACTUATOR

(71) Applicant: LaSalle Bristol Corporation, Elkhart, IN (US)

(72) Inventors: Zsolt F. Vegso, Culver, IN (US); Frank E. Alter, Elkhart, IN (US)

(73) Assignee: LaSalle Bristol Corporation, Elkhart, IN (US)

( * ) Notice: Subject to any disclaimer, the term of this patent is extended or adjusted under 35 U.S.C. 154(b) by 118 days.

(21) Appl. No.: 18/198,344

(22) Filed: May 17, 2023

(65) Prior Publication Data

US 2024/0384801 A1 Nov. 21, 2024

(51) Int. Cl.
*F16K 3/314* (2006.01)
*F16K 3/02* (2006.01)
*F16K 31/04* (2006.01)

(52) U.S. Cl.
CPC ............ *F16K 3/314* (2013.01); *F16K 31/046* (2013.01); *F16K 31/047* (2013.01); *F16K 3/0281* (2013.01)

(58) Field of Classification Search
CPC ........ F16K 3/314; F16K 1/523; F16K 31/046; F16K 31/047; F16K 3/0281; F16K 1/528; F16K 31/5286; F16K 31/46
USPC ..... 251/92, 93, 101, 102, 60, 326, 193, 284, 251/285, 289
See application file for complete search history.

(56) References Cited

U.S. PATENT DOCUMENTS

| | | | | |
|---|---|---|---|---|
| 2,512,987 | A * | 6/1950 | Young | F16K 1/523 251/285 |
| 2,743,742 | A * | 5/1956 | Muff | F16K 3/312 29/259 |
| 3,598,154 | A * | 8/1971 | Brundage | F16K 3/312 138/94.3 |
| 5,120,019 | A * | 6/1992 | Davis, Jr. | F16K 51/02 251/193 |
| 5,346,245 | A | 9/1994 | Budrow et al. | |
| 5,417,460 | A | 5/1995 | Lunder | |
| 5,678,802 | A * | 10/1997 | Lunder | F16K 31/465 251/294 |
| 5,704,659 | A | 1/1998 | Lunder | |
| 5,711,245 | A | 1/1998 | Knirck | |
| 6,098,956 | A | 8/2000 | Sprague, II | |

(Continued)

OTHER PUBLICATIONS

Valterra, Photograph, EZ-Valve Electric Waste Valve System, 1 page, undated.

(Continued)

*Primary Examiner* — Jessica Cahill

(74) *Attorney, Agent, or Firm* — Barnes & Thornburg LLP

(57) ABSTRACT

A gate valve and actuator for selectively opening and closing the gate valve. The gate valve has a housing having a passageway therethrough, a valve member moveable in the housing to selectively open and close the gate valve, and a connecting member connected to the valve member. The actuator has a linear actuator having a housing, a shaft selectively extendable from and retractable into the housing, a motor, and a bracket for connecting the linear actuator to the valve member. The bracket has a first pair of opposed slots having a length, and a second pair of opposed slots having a length greater than the length of the first pair of opposed slots. A securement mechanism selectively secures the connecting member between either the first pair of opposed slots or the second pair of opposed slots.

17 Claims, 10 Drawing Sheets

(56) References Cited

U.S. PATENT DOCUMENTS

| | | | |
|---|---|---|---|
| 6,129,117 | A | 10/2000 | Eriksson |
| 6,877,700 | B2 | 4/2005 | Smith |
| 6,962,322 | B1 | 11/2005 | Zembillas |
| 7,314,064 | B2 | 1/2008 | Frias |
| 7,810,786 | B2 | 10/2010 | Frias |
| 8,091,594 | B2 | 1/2012 | Ray |
| 8,410,948 | B2 | 4/2013 | Vander Horst |
| 8,585,010 | B2 * | 11/2013 | Yoon .................. F16K 35/06 251/104 |
| 9,845,890 | B2 | 12/2017 | Paez |
| 9,920,842 | B1 * | 3/2018 | Karani ............ F16K 37/0016 |
| 11,313,480 | B2 * | 4/2022 | Yang ................ F16K 31/524 |
| 12,038,101 | B1 * | 7/2024 | Johnson .............. F16K 3/314 |
| 2006/0284422 | A1 | 12/2006 | Lunder |
| 2007/0175532 | A1 | 8/2007 | Frias |
| 2008/0197310 | A1 * | 8/2008 | Gethmann ............ F16K 1/523 251/285 |
| 2009/0101856 | A1 * | 4/2009 | Frias .................. F16K 31/54 251/129.03 |
| 2012/0280163 | A1 | 11/2012 | Lunder |
| 2017/0198816 | A1 | 7/2017 | Paez |
| 2019/0211936 | A1 * | 7/2019 | Shimoda .............. F16K 3/314 |

OTHER PUBLICATIONS

Valterra, Photograph, E-40 EZ Valve, 1 page, undated.
Barker Manufacturing Co., Just Push a Switch Auto Drain, 1 page, undated.
Barker Manufacturing Co., Clean, Easy, and Automatic, 1 page, undated.

* cited by examiner

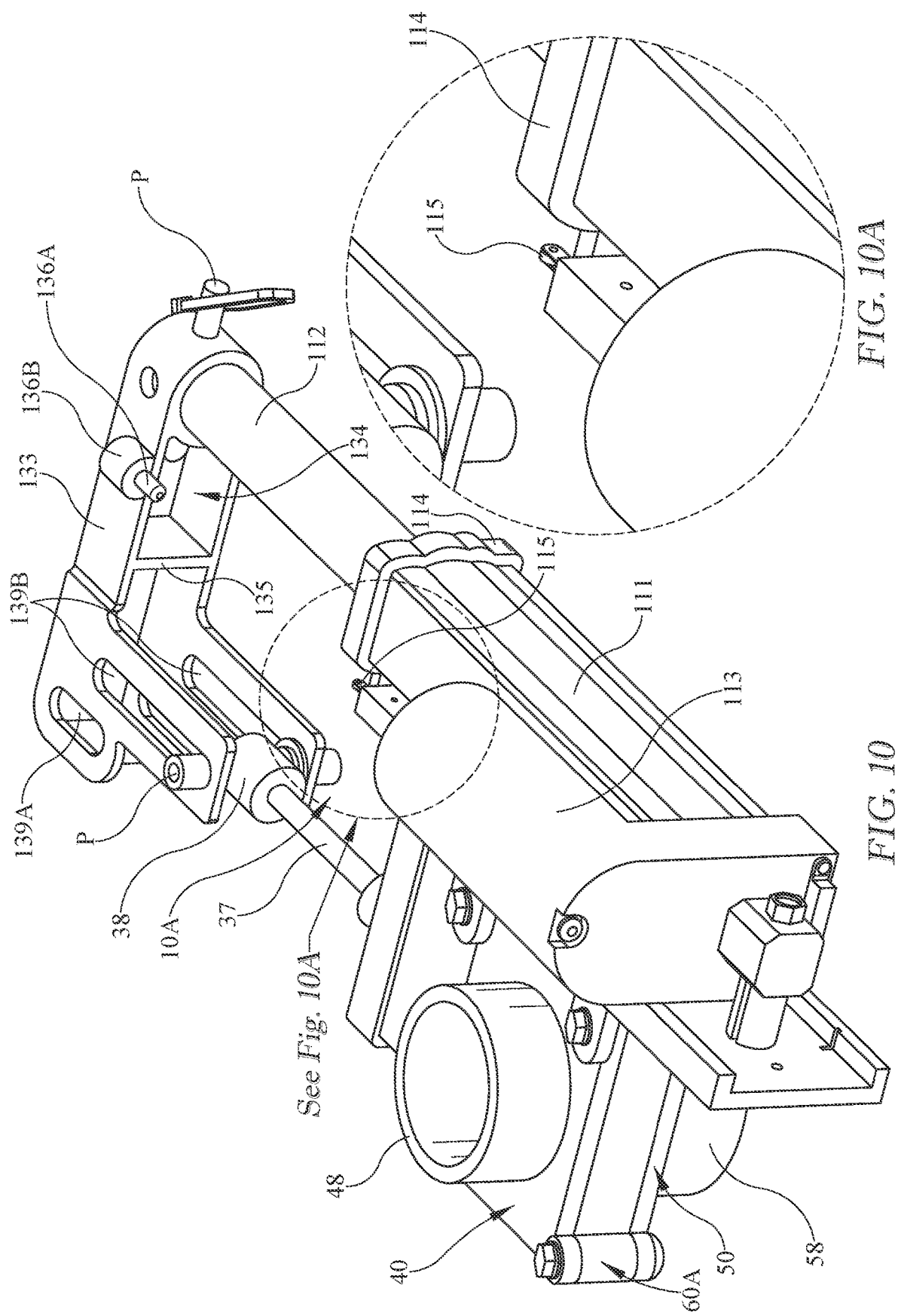

GATE VALVE AND VALVE ACTUATOR

The present invention relates to valves, and, more particularly, to gate valves and actuators for gate valves.

BACKGROUND AND SUMMARY OF THE INVENTION

Gate valves can be used to selectively permit or restrict the flow of liquids, fluids, and other materials from one location to another location. For example, a gate valve can be utilized to selectively retain liquid in a holding tank when the gate valve is closed and to release liquid from the holding tank when the gate valve is open.

Generally speaking, gate valves include a housing having an opening or passageway there through and a valve member that is moveable within the housing from a closed position that restricts passage of, for example, liquid through the passageway to an open position that permits passage of, for example, liquid through the passageway. The valve member of the gate valve can be actuated manually or through use of an electromechanical actuator. One example of a gate valve with an actuator is shown in U.S. Pat. No. 7,810,786.

In one embodiment of the present invention, a gate valve and actuator includes a gate valve, an actuator, and a securement mechanism. The gate valve has a housing, a valve member and a connecting member. The housing has a first section, a second section, and a third section located between the first section and the second section. The third section has a lower section and an upper section. Each of the first section, the second section, and the third section of the housing have a passageway therethrough. The valve member is located in the third section of the housing and is moveable between the lower section and the upper section to selectively open and close the gate valve to selectively permit and restrict flow through the passageways of the housing. The connecting member has a first end connected to the valve member and a second end connected to a handle. The actuator has a linear actuator, a first bracket and a second bracket. The linear actuator has a housing and a shaft selectively extendable from and retractable into the housing. The shaft has a first end, a motor for extending the shaft from and retracting the shaft into the housing, and an indicator switch. The first bracket connects the linear actuator to the housing of the gate valve. The second bracket connects the linear actuator to the valve member. The second bracket has a first end having a shaft mount for connecting the second bracket to the first end of the shaft, a second end, a first arm extending between the first and second ends, and a second arm spaced apart from the first arm and extending between the first and second ends. The second bracket also has a first pair of opposed slots formed in the first and second arms and a second pair of opposed slots formed in the first and second arms. The first pair of opposed slots has a length, and the second pair of opposed slots has a length greater than the length of the first pair of opposed slots. The second bracket also has an indicator switch actuator for activating the indicator switch. The securement mechanism selectively secures the handle between either the first pair of opposed slots or the second pair of opposed slots.

In one embodiment of the present invention, a gate valve and actuator include a gate valve, an actuator, and a securement mechanism. The gate valve has a housing having a passageway therethrough, a valve member moveable in the housing to selectively open and close the passageway to selectively permit and restrict flow through the passageway, and a connecting member connected to the valve member. The actuator has a linear actuator having a selectively extendable and retractable shaft, a motor, and a bracket for connecting the linear actuator to the valve member. The bracket has a first slot and a second slot. The securement mechanism selectively secures the connecting member within either the first slot or the second slot.

In one embodiment, the connecting member is a rod having a first end connected to the valve member and a second end. The securement mechanism selectively secures the second end of the connecting member within either the first slot or the second slot. In some embodiments, the gate valve and actuator further include a handle connected to the second end of the connecting member, and the securement mechanism selectively secures the handle within either the first slot or the second slot.

In other embodiments, the linear actuator has an indicator switch and the bracket includes an indicator switch actuator for actuating the indicator switch. In certain embodiments, the indicator switch and indicator switch actuator are positioned relative to each other such that the indicator switch actuator will not actuate the indicator switch unless the valve member has closed the passageway through the housing.

In some embodiments, the first slot has a length and the second slot has a length greater than the length of the first slot.

In other embodiments, the gate valve and actuator further include a third slot at least partially aligned with the first slot and spaced apart from the first slot, and a fourth slot at least partially aligned with the second slot and spaced apart from the second slot. In one embodiment, the securement mechanism selectively secures the connecting member between either the first and third slots or the second and fourth slots. In another embodiment, the first and third slots have a length and the second and fourth slots have a length greater than the length of the first and third slots. In certain embodiments, the bracket includes a first arm and a second arm, and the first and second slots are formed in the first arm and the third and fourth slots are formed in the second arm.

In other embodiments, the shaft has an end and the bracket includes a shaft mount for connecting the bracket to the end of the shaft.

In another embodiment, the bracket may be selectively connected to or disconnected from the shaft. In certain embodiments, the bracket is pivotable about the securement mechanism when the bracket is disconnected from the shaft.

In other embodiments, the gate valve and actuator include an extension limit switch for limiting the extension of the shaft.

In one embodiment of the present invention, an actuator for moving a first component having a minimum required travel distance and a second component having a minimum required travel distance shorter than the minimum required travel distance of the first component includes a linear actuator and a securement mechanism. The linear actuator has a housing, a shaft selectively extendable from and retractable into the housing, a motor, and a bracket for selectively connecting the linear actuator to either the first component or the second component. The bracket has a first slot having a length, and a second slot having a length greater than the length of the first slot. The securement mechanism selectively secures the first component within either the first slot or the second slot.

In one embodiment, the first slot is configured to move the first component its minimum travel distance when the shaft extends a first distance from the housing and the second slot is configured to move the second component its minimum travel distance when the shaft extends the first distance from the housing.

These and other features of the present invention will be apparent from the following description of embodiments of the invention and the accompanying drawings.

BRIEF DESCRIPTION OF THE DRAWINGS

FIG. 3A is an enlarged view of detail 3A in FIG. 3.

FIG. 10 is a bottom, front perspective view of the gate valve and actuator shown in FIG. 9.

FIG. 10A is an enlarged view of detail 10A in FIG. 10.

DETAILED DESCRIPTION OF EMBODIMENTS OF THE INVENTION

Figure 1:
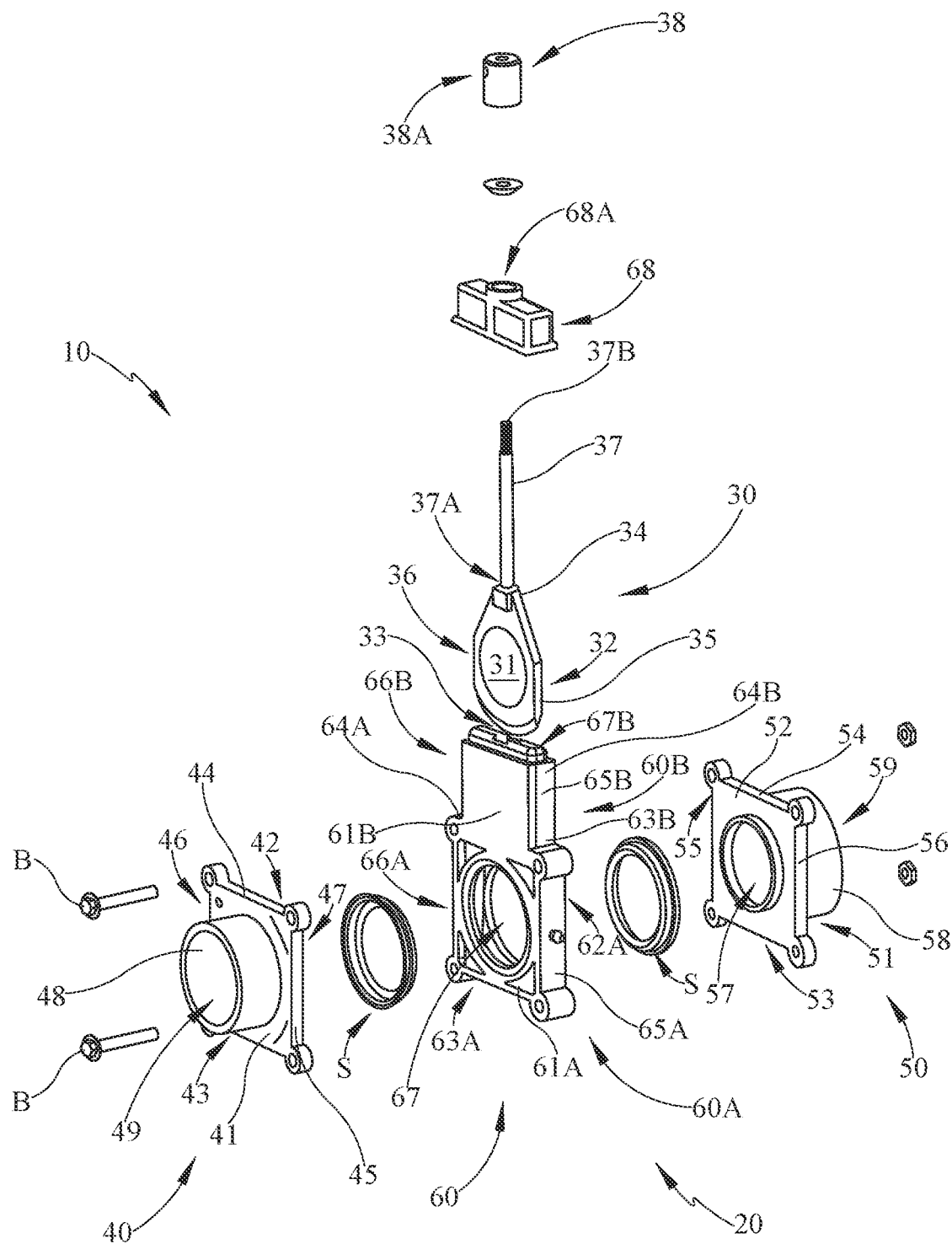
FIG. 1 is an exploded perspective view of a gate valve that is a component of a gate valve and actuator according to one embodiment of the present invention.

Referring to FIGS. 1-3A, a gate valve 10 and actuator 100 according to one embodiment of the present invention are illustrated. In the embodiment shown, gate valve 10 generally incudes a housing 20 and a valve member 30. Actuator 100 generally includes a linear actuator 110, a first bracket 120, and a second bracket 130.

Referring to FIGS. 1 and 3-5, housing 20 of gate valve 10 generally includes a first or front housing section 40, a second or rear housing section 50, a central housing section 60, and one or more seals S. In the embodiment shown, first housing section 40 has a front surface 41, a rear surface 42, a lower edge 43, an upper edge 44, a first side edge 45, a second side edge 46, a passageway 47 extending through front surface 41 and rear surface 42, and a connector 48 extending from front surface 41. Connector 48 has a passageway 49 and surrounds passageway 47.

In the embodiment shown, second housing section 50 has a front surface 51, a rear surface 52, a lower edge 53, an upper edge 54, a first side edge 55, a second side edge 56, a passageway 57 extending through front surface 51 and rear surface 52, and a connector 58 extending from front surface 51. Connector 58 has a passageway 59 and surrounds passageway 57.

In the embodiment shown, central housing section 60 has a first or lower section 60A and a second or upper section 60B. Lower section 60A has a front surface 61A, a rear surface 62A, a lower edge 63A, an upper edge 64A, a first side edge 65A, a second side edge 66A, and a passageway 67A extending through front surface 61A and rear surface 62A. Upper section 60B has a front surface 61B, a rear surface 62B, a lower edge 63B connected to upper edge 64A of lower section 60A, an upper edge 64B, a first side edge 65B, a second side edge 66B, and an opening 67B formed in upper edge 64B. Central housing section 60 further includes a cover 68 having an opening 68A extending therethrough. Cover 68 is configured to engage upper edge 64B of upper section 60B of central housing section 60 and close opening 67B, thereby retaining valve member 30 in central housing section 60.

Valve member 30 in the embodiment shown is a substantially planar member having a front surface 31, a rear surface 32, a lower edge 33, an upper edge 34, a first side edge 35, a second side edge 36, a connecting member 37, and a handle 38. In the embodiment shown, connecting member 37 is a rod having a first end 37A connected to upper edge 34 of valve member 30 and a second end 37B connected to handle 38. Connecting member 37 is configured so as to be able to extend into opening 68A of cover 68. Handle 38 is provided with an opening or passageway 38A extending therethrough for receiving a pin or other fastening mechanism to secure handle 38 to second bracket 130 as described below. Alternatively, handle 38 may be provided with one or more openings 38A that extend partially through handle 38. In certain embodiments of the invention, openings 38A are internally threaded.

Valve member 30 may be captured in central housing 60 by inserting valve member 30 through opening 67B in upper section 60B of central housing section 60, and securing cover 68 over upper edge 64B with connecting member 37 extending through opening 68A. Lower section 60A of central housing section 60 may then be positioned between first housing section 40 and second housing section 50. The housing sections may be secured together (with seals S therebetween) with one or more bolts or fasteners B.

In the embodiment shown, linear actuator 110 generally includes a housing 111, a shaft 112, a motor 113, a support member 114, and an indicator switch 115. Housing 111 has a first end 116 and a second end 117. Support member 114 is connected to second end 117 of housing 111. Shaft 112 can be selectively extended from and retracted into housing 111 through second end 117 of housing 111. Shaft 112 has an end 118 having one or more openings 119 therein for receiving a pin P or other securing mechanism to connect shaft 112 to second bracket 130 as described below. In one embodiment of the invention, a single opening 119 extends through end 118 of shaft 112. In another embodiment of the invention, multiple openings 119 extend through end 118 of shaft 112 to permit the user to select the location of the pin or securement mechanism. For example, in one embodiment of the invention, two openings 119 arranged at a 90 degree angle to each other extend through end 118 of shaft 112. In certain embodiments of the invention, openings 119 are internally threaded. Motor 113 can be any type of motor (such as a DC motor) sufficient to extend and retract shaft 112 as is known in the art. Linear actuator 110 includes internal extension and retraction limit switches that turn motor 113 off to limit the distance shaft 112 extends from and retracts into housing 111.

Figure 3:
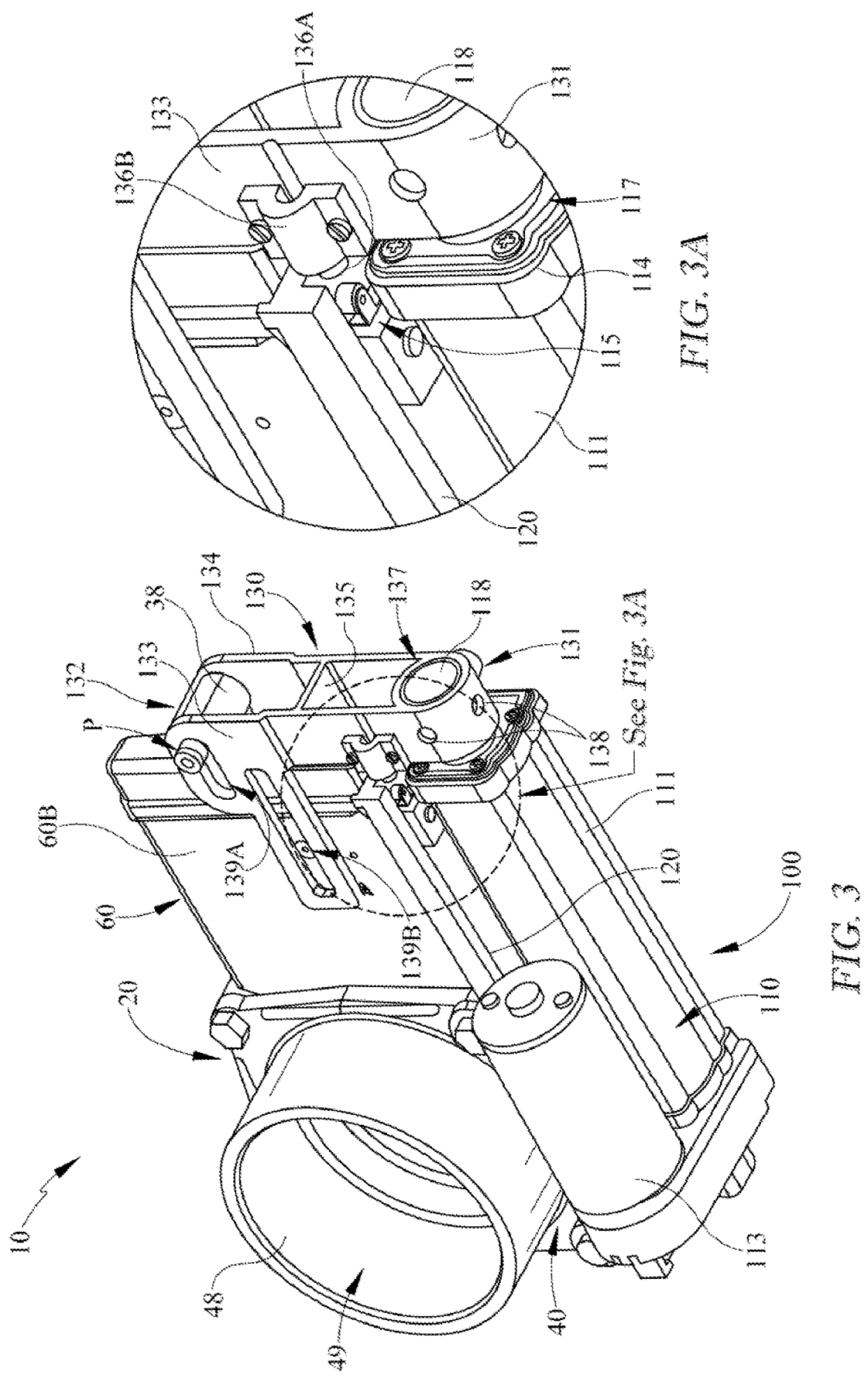
FIG. 3 is a front perspective view of the gate valve shown in FIG. 1 and the actuator shown in FIG. 2 assembled to form a gate valve and actuator according to one embodiment of the present invention, with the gate valve in the closed position.
Figure 4:
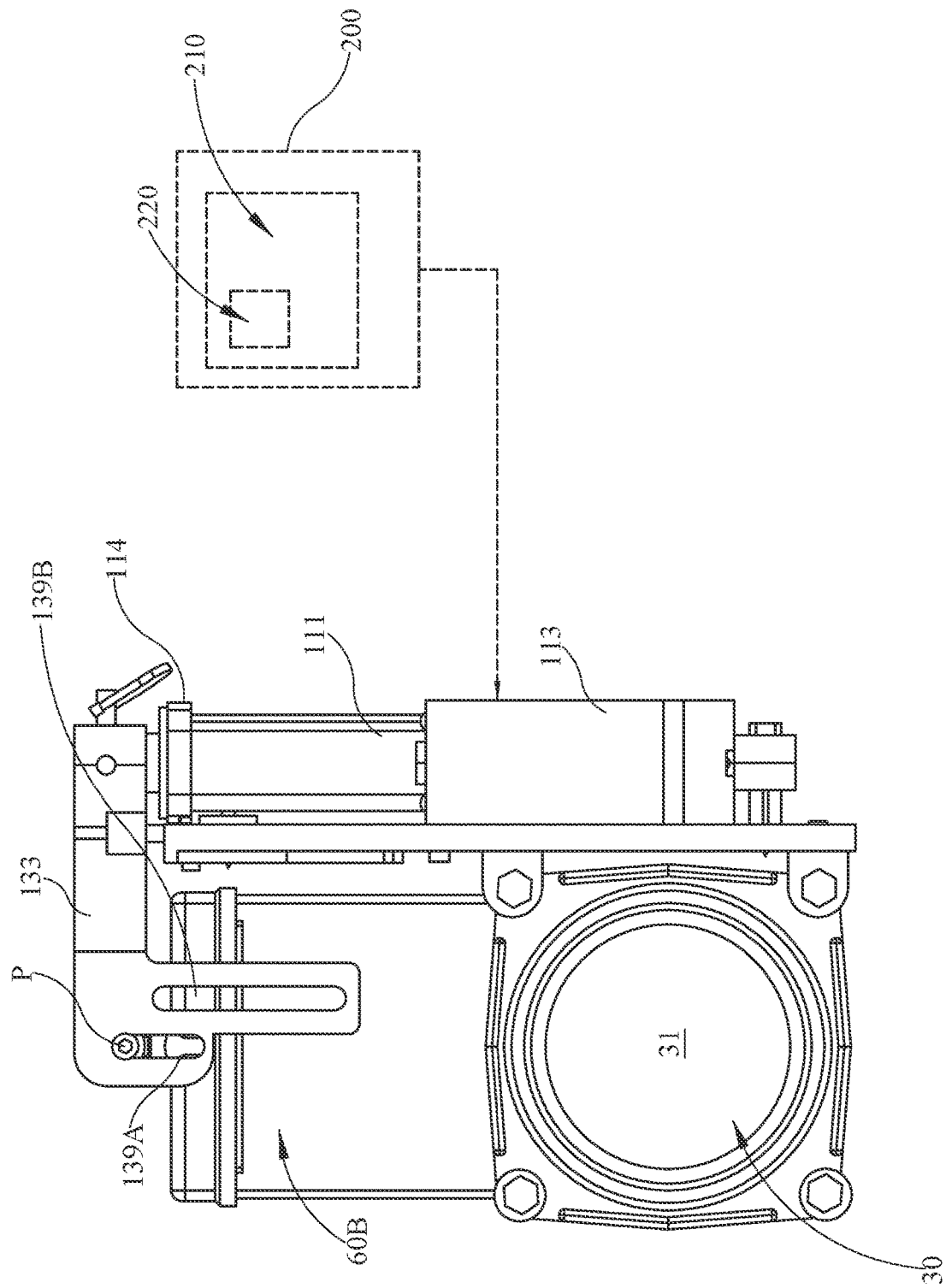
FIG. 4 is a front elevational view of the gate valve and actuator shown in FIG. 3.
Figure 5:
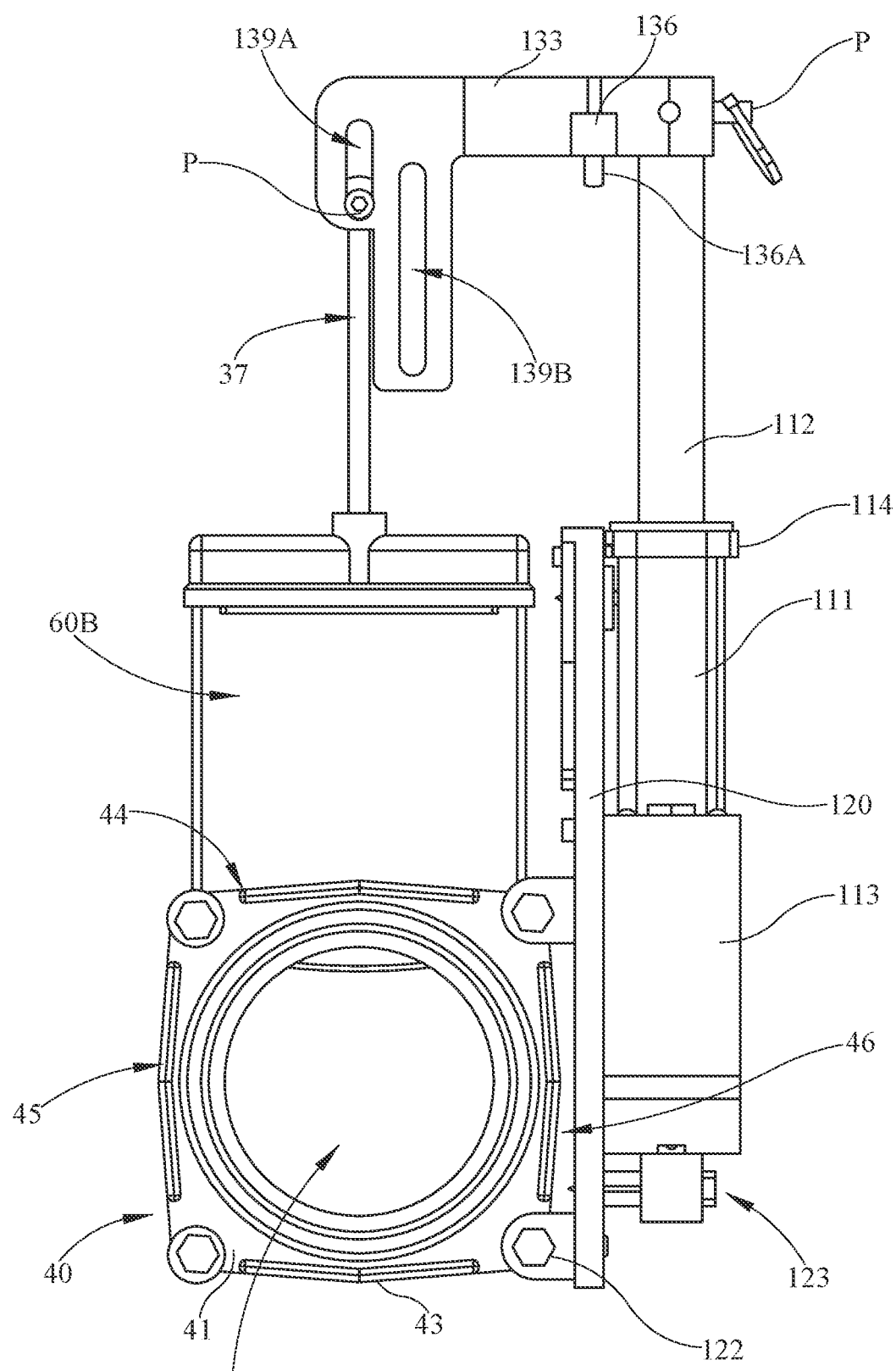
FIG. 5 is a front elevational view of the gate valve and actuator shown in FIG. 3, with the gate valve in the open position.
Figure 6:
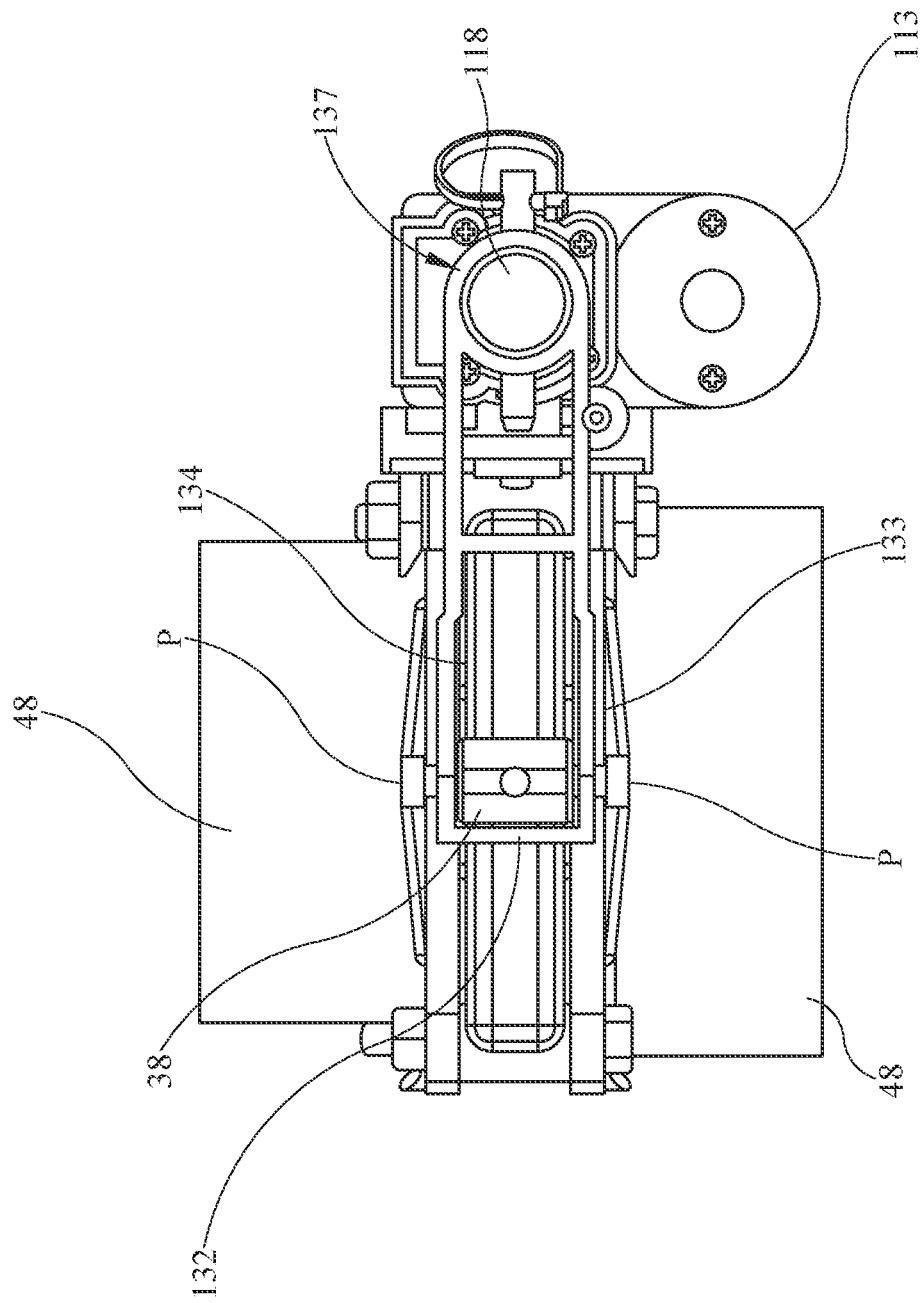
FIG. 6 is a top plan view of the gate valve and actuator shown in FIG. 3.

First bracket 120 connects linear actuator 110 to gate valve 10. Specifically, in the embodiment shown, first bracket 120 includes tabs 121 having openings through which bolts or other fasteners 122 can be inserted so as to secure first bracket 120 to first housing section 40, second housing section 50, and lower section 60A of central housing section 60 as shown in FIG. 3. Similarly, linear actuator 110 can be connected to first bracket 120 by one or more bolts or other fasteners 123 as shown in FIG. 3 and by connecting support member 114 to second bracket 120 as shown in FIG. 4.

Second bracket 130 in the embodiment shown has a first end 131, a second end 132, a first arm 133, a second arm 134, a reinforcing member 135, and an indicator switch actuator 136. First end 131 includes a shaft mount 137 for connecting shaft 112 of linear actuator 110 to second bracket 130. In the embodiment shown, shaft mount 137 is an integrally formed cylindrical structure having openings 138 corresponding to openings 119 in end 118 of shaft 112. First arm 133 and second arm 134 have a first pair of opposed openings or slots 139A and a second pair of opposed openings or slots 139B for connecting second bracket 130 to handle 38 of valve member 30 as described below. Each of slots 139A and 139B have a first or lower end LE and a second or upper end UE. In the embodiment shown, slots 139B are longer than slots 139A. Indicator switch actuator 136 in the embodiment shown is a pin 136A that can be extended from and retracted into first arm 133. For example, one end of pin 136A can be externally threaded and first arm 133 can be provided with an internally threaded mount 136B in which pin 136A can be secured. The distance by which pin 136A extends from mount 136B can be adjusted by rotating pin 136A clockwise or counterclockwise as desired. Reinforcing member 135 in the embodiment shown is a cross-member that extends between first arm 133 and second arm 134.

Second bracket 130 connects valve member 30 to linear actuator 110. As shown in FIGS. 1 and 4, handle 38 is positioned between first arm 133 and second arm 134 of second bracket 130 such that openings 38A are accessible through, for example, slots 139A. One or more pins, threaded fasteners or other securement mechanisms P are inserted through slots 139A and into openings 38A. Note that because pins P have heads that are larger in dimension than the width of slots 139A, securing pins P to handle 38 traps handle 38 between first arm 133 and second arm 134 of second bracket 130. Second bracket 130 is connected to linear actuator 110 by positioning shaft mount 137 around end 118 of shaft 112 and inserting one or more pins, threaded fasteners, or other securement mechanisms P through openings 138 and in second bracket 130 and openings 119 in end 118 of shaft 112.

Operation of gate valve 10 and actuator 100 can be controlled by a controller 200. In certain embodiments of the invention, controller 200 is a programmable logic controller. In the embodiment shown in FIG. 4, controller 200 includes a control panel 210 and an indicator light 220. Controller 200 may communicate with actuator 100 through a wired, wireless or other connection. In other embodiments of the invention, controller 200 is a switch, such as, for example, a rocker switch with an integrated indicator light. Other control devices can also be utilized as controller 200.

Figure 2:
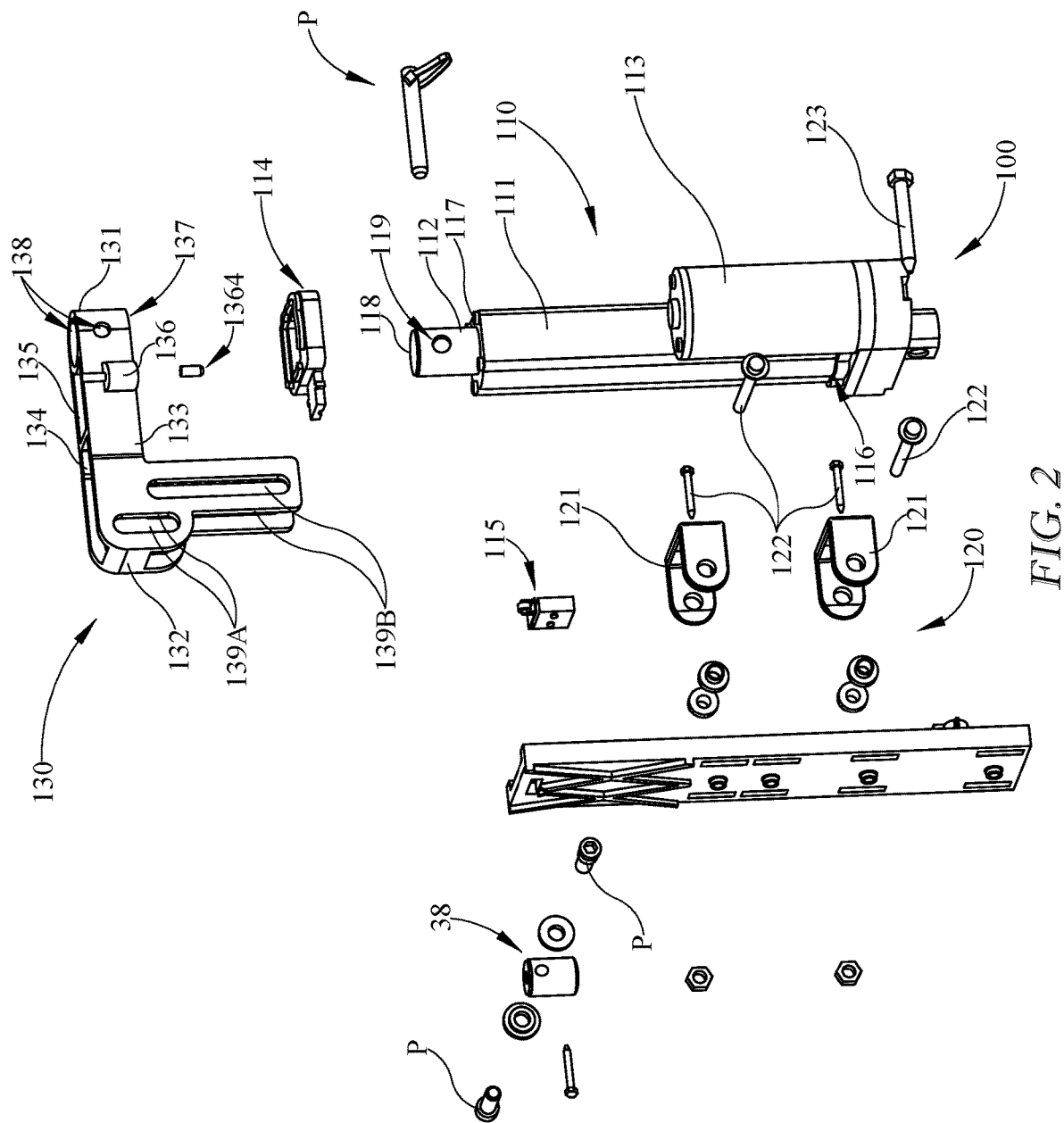
FIG. 2 is an exploded perspective view of an actuator that is a component of a gate valve and actuator according to one embodiment of the present invention.

FIG. 2 shows gate valve 10 in the closed position. In this position, shaft 112 is at least partially retracted into housing 111 of linear actuator 110, valve member 30 is positioned in lower section 60A of central housing 60 so as to block passageways 47, 49, 57, 59, and 67 (thereby preventing flow through the passageways), and pin 136A contacts indicator switch 115, which turns indicator light 220 off. Note that in the closed position, pins P that connect handle 38 to second bracket 130 are spaced apart from lower end LE of slots 139A. In the embodiment shown in FIG. 2, pins P are positioned adjacent upper ends UE of slots 139A. However, pins P can be located at any position in slots 139A that is sufficiently spaced apart from lower end LE of slots 139A so as to permit valve member 30 to be raised the desired distance as describe below.

To open gate valve 10, controller 200 is used to actuate motor 113 to extend shaft 112 from housing 111 of linear actuator 110. Because first end 131 of second bracket 130 is connected to end 118 of shaft 112, extending shaft 112 pushes second bracket 130 away from second end 117 of housing 111 as shown in FIG. 3. As bracket 130 moves, lower ends LE of slots 139A will approach pins P located in slots 139A. When lower edges LE of slots 139A contact pins P, continued movement of second bracket 130 will pull handle 38 away from upper edge 64B of upper section 60B of central housing 60 of gate valve 10, which causes valve member 30 to move from lower section 60A into upper section 60B and clear passageways 47, 49, 57, 59, and 67, thereby permitting flow through the passageways. Note that valve member 30 can be moved so as to either fully or partially clear passageways 47, 49, 57, 59, and 67 to regulate flow through gate valve 10. For example, motor 113 can be turned on and allowed to operate until shaft 112 reaches the maximum desired extension limit, at which time the extension limit switch will be actuated and automatically and turn off motor 113. Alternatively, the user can manually turn off motor 113 when desired. As shaft 112 extends from housing 111, pin 136A will disengage from indicator switch 115, which turns on indicator light 220.

To close gate valve 10, controller 200 is used to actuate motor 113 to retract shaft 112 into housing 111, which in turn draws second bracket 130 in the opposite direction. When upper ends UE of slots 139A contact pins P in slots 139A, second bracket 130 will push handle 38 toward upper edge 64B of upper section 60B of central housing 60 of gate valve 10, which causes valve member 30 to move from upper section 60B into lower section 60A and block passageways 47, 49, 57, 59, and 67, thereby preventing flow through the passageways. Shaft 112 will retract into housing 111 until the retraction limit switch in linear actuator 110 is activated, which turns off motor 113. To provide visual confirmation that gate valve 10 is fully closed, pin 136A is positioned to extend from mount 136B such that it will not actuate indicator switch 115 and turn off indicator light 220 until valve member 30 is positioned in lower section 60A of central housing 60 to completely block passageways 47, 49, 57, 59, and 67.

Figure 7:
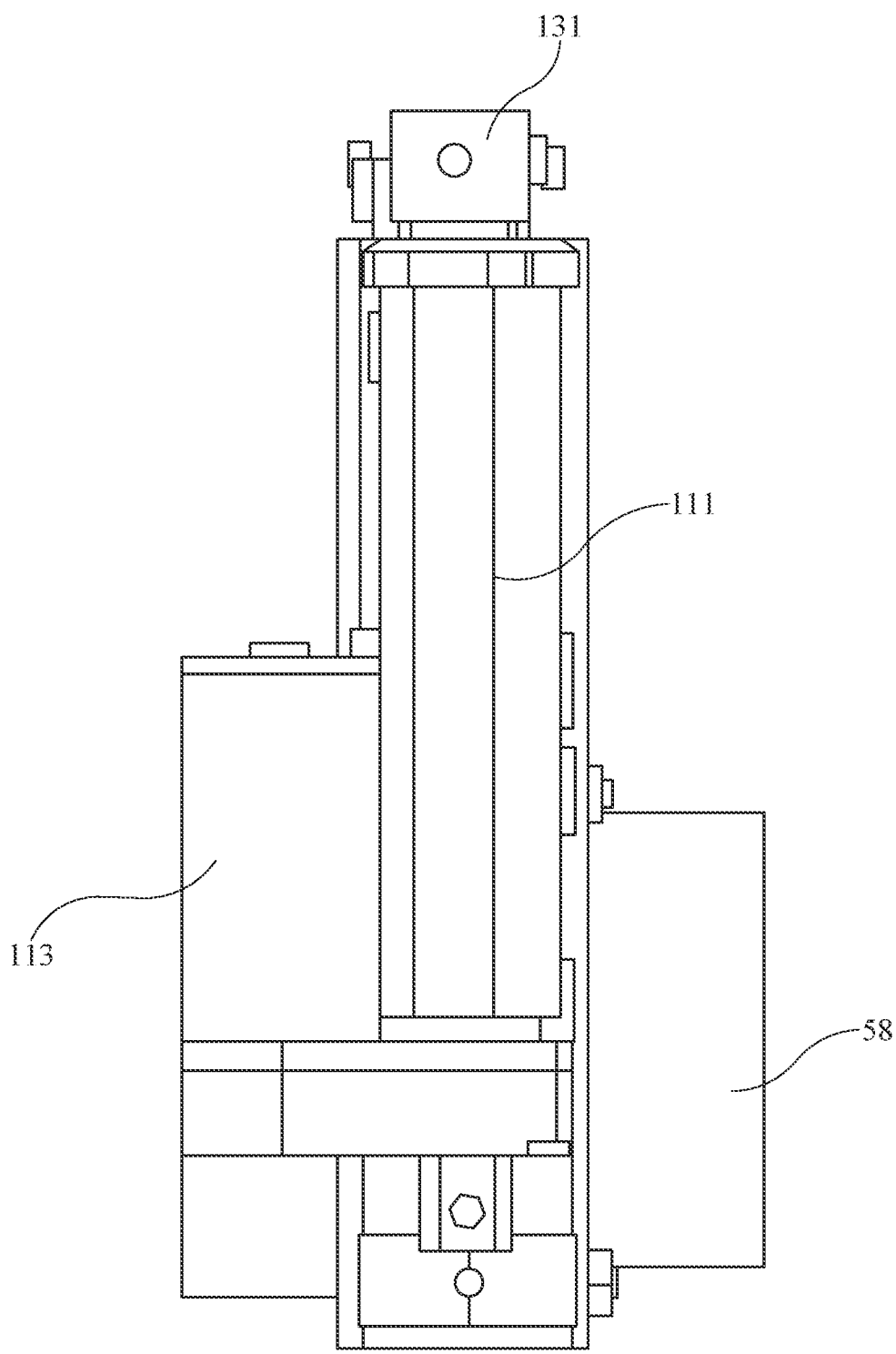
FIG. 7 is a right side elevational view of the gate valve and actuator shown in FIG. 3.
Figure 8:
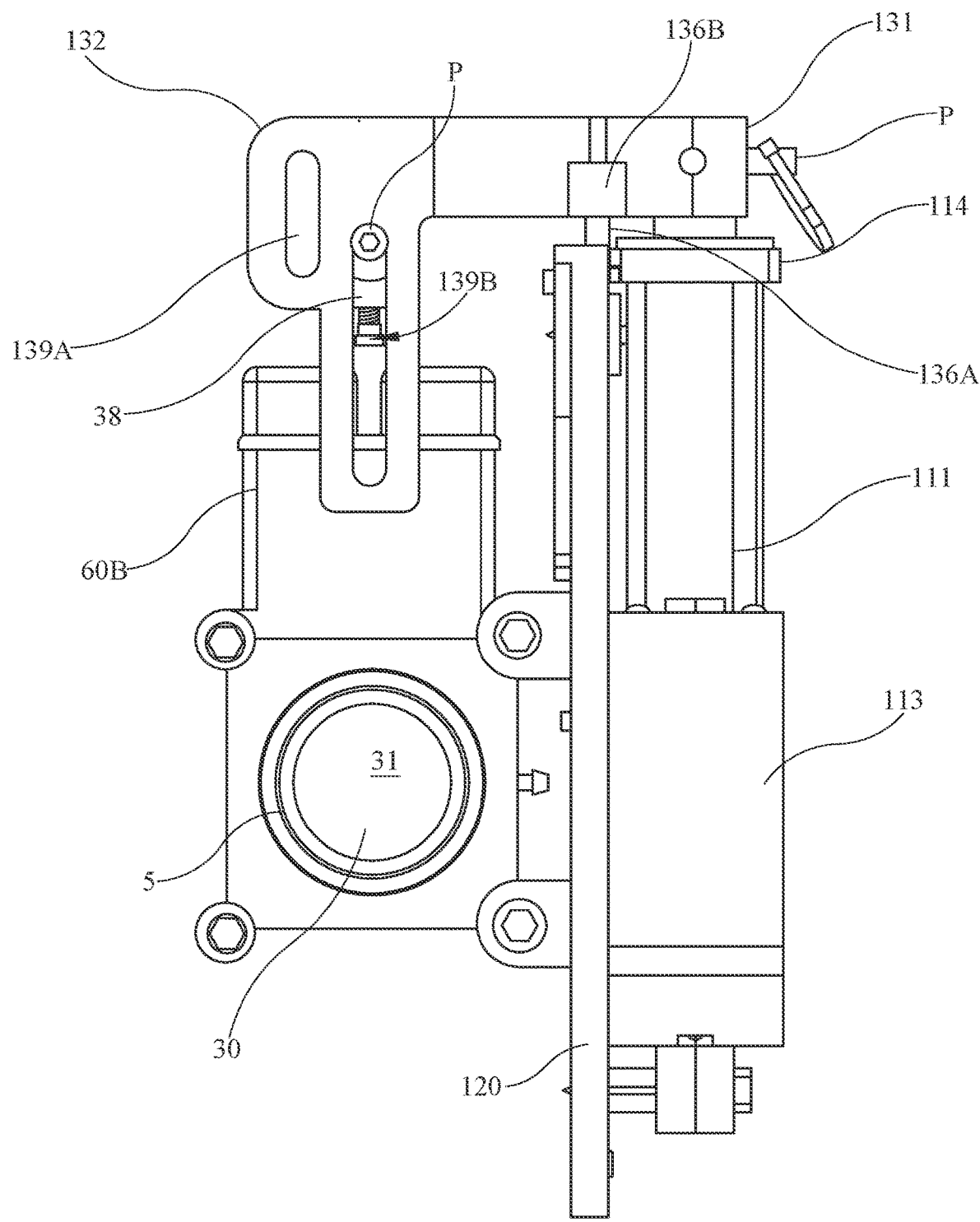
FIG. 8 is a front elevational view of the gate valve and actuator shown in FIG. 3, with the gate valve in the closed position.
Figure 9:
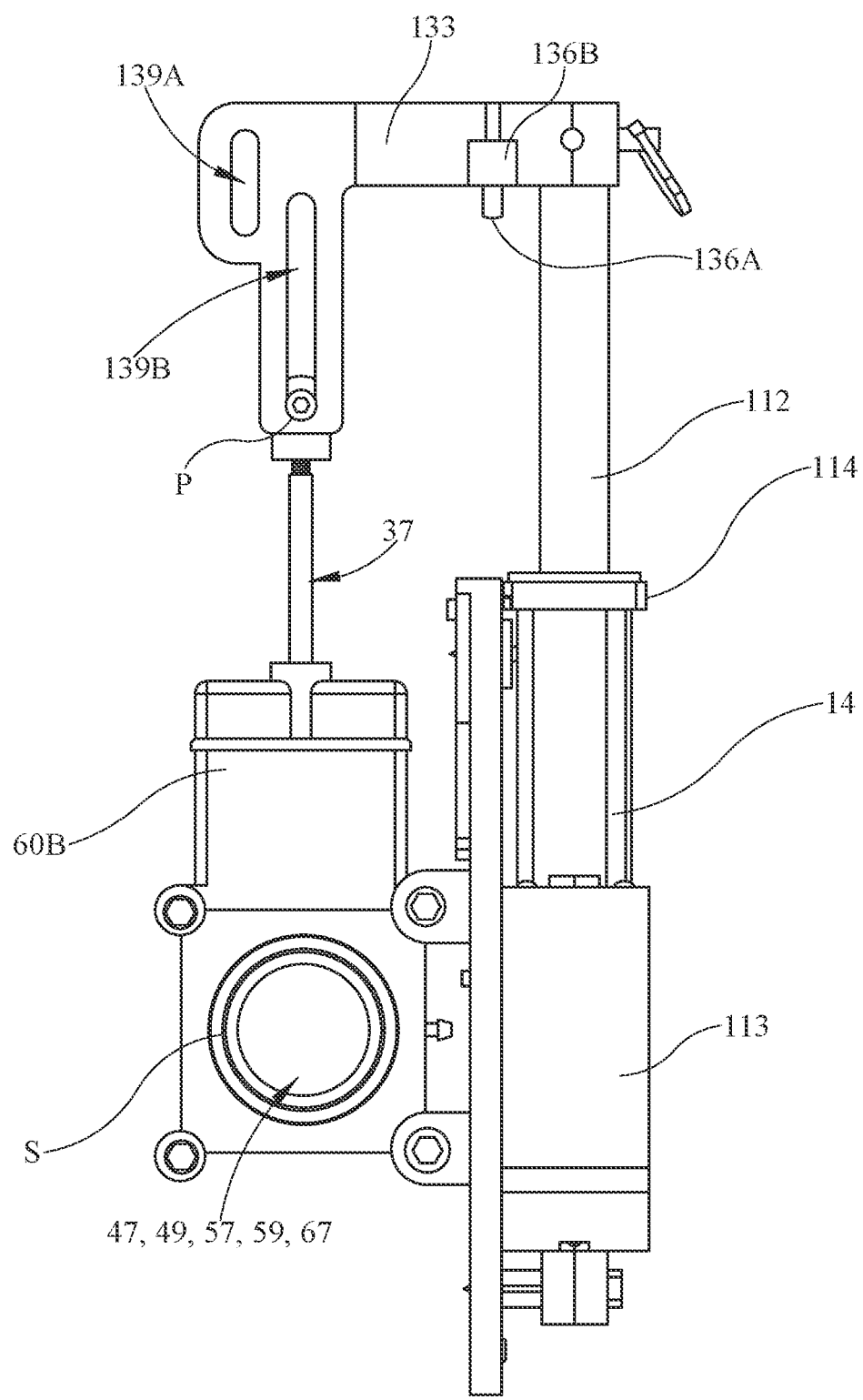
FIG. 9 is a front elevational view of the gate valve and actuator shown in FIG. 3, with the gate valve in the open position.

Handle 38 can alternatively be connected to second bracket 130 by positioning handle 38 between first arm 133 and second arm 134 of second bracket 130 such that openings 38A are accessible through slots 139B. Pins P are inserted through slots 139B and into openings 38A as described above to trap handle 38 between first arm 133 and second arm 134 of second bracket 130. (FIGS. 7-8) Because slots 139B are longer than slots 139A, pins P can be positioned in slots 139B such that second bracket 130 must travel a greater distance (relative to the required distance of travel if slots 139A were utilized) before lower ends LE of slots 139B contact pins P and draw valve member 30 out of lower section 60A of central housing 60. Stated another way, because slots 139A are shorter than slots 139B, pins P can be positioned in slots 139A such that lower ends LE of slots 139A will contact pins P at a point earlier in the extension of shaft 112 than lower ends LE of slots 139B would contact pins P if pins P were positioned in slots 139B the same distance from upper edge 64B of upper section 60B of central housing section 60 of gate valve 10. Earlier contact between lower ends LE and pins P results in greater possible travel distance of valve member 30. These features permit a single linear actuator 110 and second bracket 130 to be used with gate valves having different stroke lengths.

Gate valve 10 can also be manually opened and closed. To do so, pins P are first removed from openings 138 in second bracket 130 and openings 119 in end 118 of shaft 112. Second end 132 of second bracket 130 is then pivoted around pins P in slots 139A or 139B (as applicable) so as to disengage shaft mount 137 from end 118 of shaft 112 as shown in Figure-. The user can then pull or push second bracket 130 to drive handle 38 in the desired direction to open or close gate valve 10.

Although the present invention has been described in detail, the same is to be taken by way of example only and not by way of limitation. Numerous modifications can be made to the embodiments shown without departing from the scope of the present invention. For example, second bracket 130 can include more than two pairs of slots. The slots can be of different lengths and relative lengths than those illustrated. Other means of attaching second bracket 130 to gate valve 10 and linear actuator 110 can be utilized. Different types of linear actuators can also be utilized. Linear actuator 110 and/or bracket 130 can also be utilized to operate devices other than gate valves.

What is claimed is:

1. A gate valve and actuator, including:
    a gate valve having:
        a housing having a first section, a second section, and a third section located between the first section and the second section, the third section having a lower section and an upper section, each of the first section, the second section, and the third section of the housing having a passageway therethrough;
        a valve member located in the third section of the housing and moveable between the lower section and the upper section to selectively open and close the gate valve to selectively permit and restrict flow through the passageways of the housing; and
        a connecting member having a first end connected to the valve member and a second end connected to a handle;
    an actuator having:
        a linear actuator having a housing, a shaft selectively extendable from and retractable into the housing, the shaft having a first end, a motor for extending the shaft from and retracting the shaft into the housing, and an indicator switch;
        a first bracket for connecting the linear actuator to the housing of the gate valve; and
        a second bracket for connecting the linear actuator to the valve member, the second bracket having a first end having a shaft mount for connecting the second bracket to the first end of the shaft, a second end, a first arm extending between the first and second ends, a second arm spaced apart from the first arm and extending between the first and second ends, a first pair of opposed slots formed in the first and second arms, the first pair of opposed slots having a length, a second pair of opposed slots formed in the first and second arms, the second pair of opposed slots having a length greater than the length of the first pair of opposed slots, and an indicator switch actuator for activating the indicator switch; and
    a securement mechanism for selectively securing the handle between either the first pair of opposed slots or the second pair of opposed slots.

2. A gate valve and actuator, including:
    a gate valve having a housing having a passageway therethrough, a valve member moveable in the housing to selectively open and close the passageway to selectively permit and restrict flow through the passageway, and a connecting member connected to the valve member;
    an actuator having a linear actuator having a selectively extendable and retractable shaft, a motor, and a bracket for connecting the linear actuator to the valve member, the bracket having a first slot and a second slot; and
    a securement mechanism for selectively securing the connecting member within either the first slot or the second slot.

3. The gate valve and actuator according to claim 2, wherein the connecting member is a rod having a first end connected to the valve member and a second end, and wherein the securement mechanism selectively secures the second end of the connecting member within either the first slot or the second slot.

4. The gate valve and actuator according to claim 3, further including a handle connected to the second end of the connecting member, and wherein the securement mechanism selectively secures the handle within either the first slot or the second slot.

5. The gate valve and actuator according to claim 2, wherein the linear actuator has an indicator switch and the bracket includes an indicator switch actuator for actuating the indicator switch.

6. The gate valve and actuator according to claim 5, wherein the indicator switch and indicator switch actuator are positioned relative to each other such that the indicator switch actuator will not actuate the indicator switch unless the valve member has closed the passageway through the housing.

7. The gate valve and actuator according to claim 2, wherein the first slot has a length and the second slot has a length greater than the length of the first slot.

8. The gate valve and actuator according to claim 2, further including a third slot at least partially aligned with the first slot and spaced apart from the first slot, and a fourth slot at least partially aligned with the second slot and spaced apart from the second slot.

9. The gate valve and actuator according to claim 8, wherein the securement mechanism selectively secures the connecting member between either the first and third slots or the second and fourth slots.

10. The gate valve and actuator according to claim 8, wherein the first and third slots have a length and the second and fourth slots have a length greater than the length of the first and third slots.

11. The gate valve and actuator according to claim 8, wherein the bracket includes a first arm and a second arm, and wherein the first and second slots are formed in the first arm and the third and fourth slots are formed in the second arm.

12. The gate valve and actuator according to claim 2, wherein the shaft has an end and the bracket includes a shaft mount for connecting the bracket to the end of the shaft.

13. The gate valve and actuator according to claim 2, wherein the bracket may be selectively connected to or disconnected from the shaft.

14. The gate valve and actuator according to claim 13, wherein the bracket is pivotable about the securement mechanism when the bracket is disconnected from the shaft.

15. The gate valve and actuator according to claim 2, further including an extension limit switch for limiting the extension of the shaft.

16. An actuator for moving a first component having a minimum required travel distance and a second component having a minimum required travel distance shorter than the minimum required travel distance of the first component, the actuator including:
  a linear actuator having a housing, a shaft selectively extendable from and retractable into the housing, a motor, and a bracket for selectively connecting the linear actuator to either the first component or the second component, the bracket having a first slot having a length, and a second slot having a length greater than the length of the first slot; and
  a securement mechanism for selectively securing the first component within either the first slot or the second slot.

17. The actuator according to claim 16, wherein the first slot is configured to move the first component its minimum travel distance when the shaft extends a first distance from the housing and the second slot is configured to move the second component its minimum travel distance when the shaft extends the first distance from the housing.

* * * * *